US012700257B2

(12) United States Patent (10) Patent No.: US 12,700,257 B2
Kimhi (45) Date of Patent: Aug. 4, 2026

(54) CASCADED DETECTION OF FACIAL ATTRIBUTES

(71) Applicant: DSP GROUP LTD., Herzelia (IL)

(72) Inventor: Tomer Kimhi, Tel Aviv (IL)

(73) Assignee: DSP Group Ltd., Herzelia (IL)

( * ) Notice: Subject to any disclaimer, the term of this patent is extended or adjusted under 35 U.S.C. 154(b) by 211 days.

(21) Appl. No.: 18/361,783

(22) Filed: Jul. 28, 2023

(65) Prior Publication Data

US 2024/0037985 A1 Feb. 1, 2024

Related U.S. Application Data

(60) Provisional application No. 63/393,983, filed on Aug. 1, 2022.

(51) Int. Cl.
*G06V 40/16* (2022.01)
*G06F 3/01* (2006.01)
*G06T 7/70* (2017.01)
*G06V 10/25* (2022.01)

(52) U.S. Cl.
CPC ............ *G06V 40/168* (2022.01); *G06F 3/013* (2013.01); *G06T 7/70* (2017.01); *G06V 10/25* (2022.01); *G06V 40/172* (2022.01)

(58) Field of Classification Search
None
See application file for complete search history.

(56) References Cited

U.S. PATENT DOCUMENTS

| | | | |
|---|---|---|---|
| 10,713,794 B1 * | 7/2020 | He | G06N 3/084 |
| 10,831,926 B1 | 11/2020 | Zylberberg et al. | |
| 2004/0264744 A1 * | 12/2004 | Zhang | G06F 18/214 |
| | | | 382/118 |
| 2006/0056056 A1 * | 3/2006 | Ahiska | G08B 13/19643 |
| | | | 359/690 |
| 2008/0129855 A1 * | 6/2008 | Vitsnudel | H04N 23/698 |
| | | | 348/E5.091 |

(Continued)

OTHER PUBLICATIONS

Zhang, Wei, Gregory Zelinsky, and Dimitris Samaras. "Real-time accurate object detection using multiple resolutions." 2007 IEEE 11th International Conference on Computer Vision. IEEE, 2007. (Year: 2007).*

(Continued)

*Primary Examiner* — Michelle M Entezari Hausmann
(74) *Attorney, Agent, or Firm* — Paradice & Li LLP

(57) ABSTRACT

This disclosure provides methods, devices, and systems for object detection in images. The present implementations more specifically relate to cascaded object detection techniques. In some aspects, an object detection system may obtain a first image and perform a first object detection operation on the first image. The object detection system may select a region of interest (ROI) in the first image based at least in part on the object detection operation, the ROI being selected before the object detection operation is completed. The object detection system may obtain a second image coinciding with the ROI of the first image, the second image having a higher resolution than the first image. The object detection system may selectively perform an inferencing operation on the second image based on a result of the object detection operation.

20 Claims, 7 Drawing Sheets

(56) References Cited

U.S. PATENT DOCUMENTS

| | | | |
|---|---|---|---|
| 2009/0190803 A1* | 7/2009 | Neghina .............. | G06V 40/166 |
| | | | 348/207.99 |
| 2012/0093368 A1* | 4/2012 | Choi .................... | H04N 23/611 |
| | | | 382/103 |
| 2017/0085790 A1* | 3/2017 | Bohn ..................... | H04N 23/90 |
| 2017/0339409 A1* | 11/2017 | Socek ................. | H04N 19/167 |
| 2019/0188504 A1* | 6/2019 | Aihara ................... | H04N 23/55 |
| 2019/0377965 A1* | 12/2019 | Totolos, Jr. ........... | G06N 3/045 |
| 2022/0222829 A1* | 7/2022 | Kamboj ................. | G06T 7/248 |
| 2023/0245303 A1* | 8/2023 | Miller ................. | G06V 20/695 |
| | | | 382/128 |
| 2024/0210506 A1* | 6/2024 | Ji ........................ | G01R 33/5608 |
| 2025/0216345 A1* | 7/2025 | Lemmer .............. | G06T 3/4053 |

OTHER PUBLICATIONS

Dosi M, Chiranjeev C, Agarwal S, Chaudhary J, Manchanda S, Balutia K, Bhagwatkar K, Vatsa M, Singh R. Seg-dgdnet: Segmentation based disguise guided dropout network for low resolution face recognition. IEEE Journal of Selected Topics in Signal Processing. Jun. 26, 2023;17(6):1264-76. (Year: 2023).*

* cited by examiner

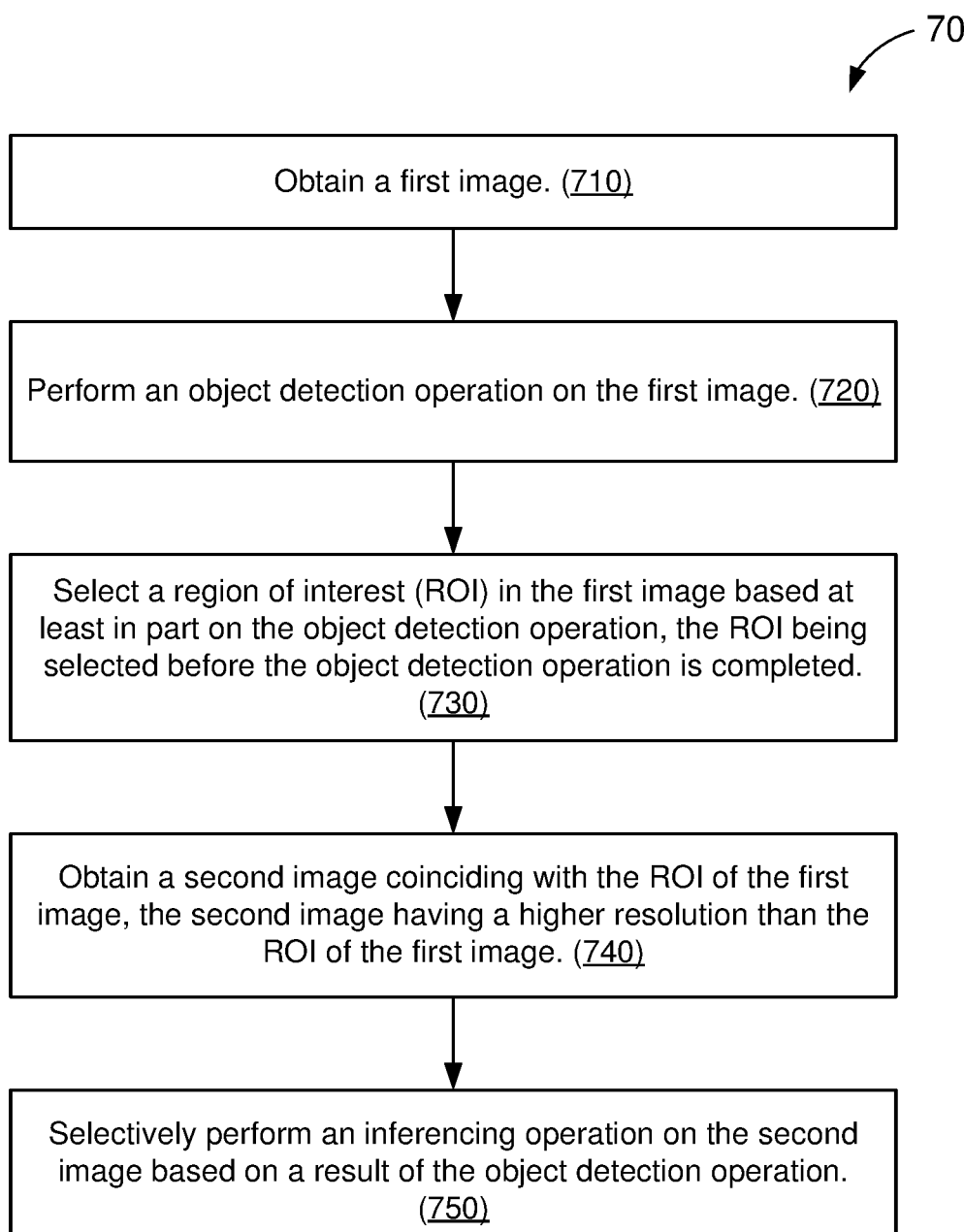

700

Obtain a first image. (710)

Perform an object detection operation on the first image. (720)

Select a region of interest (ROI) in the first image based at least in part on the object detection operation, the ROI being selected before the object detection operation is completed. (730)

Obtain a second image coinciding with the ROI of the first image, the second image having a higher resolution than the ROI of the first image. (740)

Selectively perform an inferencing operation on the second image based on a result of the object detection operation. (750)

FIG. 7

CASCADED DETECTION OF FACIAL ATTRIBUTES

CROSS-REFERENCE TO RELATED APPLICATIONS

This application claims the benefit of U.S. Provisional Application No. 63/393,983, titled "Cascaded Detection of Facial Attributes," filed on Aug. 1, 2022, which is incorporated by reference herein in its entirety.

TECHNICAL FIELD

The present implementations relate generally to object detection in images, and specifically to cascaded detection of facial attributes.

BACKGROUND OF RELATED ART

Computer vision is a field of artificial intelligence (AI) that mimics the human visual system to draw inferences about an environment from images or video of the environment. Example computer vision technologies include object detection, object classification, and object tracking, among other examples. Object detection encompasses various techniques for detecting objects in the environment that belong to a known class (such as humans, cars, or text). For example, the presence and location of an object can be detected or inferred by scanning an image for a set of features (such as eyes, nose, and lips) that are unique to objects of a particular class (such as humans). Some object detection techniques rely on statistical models for feature extraction whereas other object detection techniques rely on neural network models for feature extraction. Such models can be used for localizing objects in images and may be generally referred to as "object detection models."

Some computer vision techniques may further perform one or more object-specific inferencing operations on the object of interest (e.g., to classify the object, to determine a gaze direction of a person, or to identify the object or person). Both object detection and object-specific inferencing operations can be computationally heavy and resource-intensive. For example, an object detection operation can take a relatively long period to complete, during which time an object of interest may have moved relative to the camera. Thus, by the time the object detection operation has detected an object of interest, the object may have since moved away from the detected location.

Additionally, object-specific inferencing operations are often performed on higher resolution images (than those used for object detection) with finer details or features that can be used to infer more detailed information about the object of interest (such as a gaze direction). However, systems and devices can expend significant computing resources when performing object-specific inferencing operations directly on high resolution images. Thus, existing computer vision applications may perform object detection on a lower resolution image to identify a region of interest (ROI), which represents a relatively small portion of an image in which an object of interest is detected, and then perform object-specific inferencing operations on the ROI of a higher resolution image. However, this approach may lead to inaccurate inferencing results due to movement of the object while the object detection operation is being performed. For example, a person may be walking towards a camera in a particular image but may have exited the field of view (FOV) of the camera by the time a computer vision application detects the person in the image). Thus, by the time the computer vision system captures a higher resolution image, the detection result may no longer be relevant.

Accordingly, there is a need for quicker and more efficient object detection in images so that the detection result remains relevant for subsequent inferencing operations.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of object detection in images. The method includes obtaining a first image; performing an object detection operation on the first image; selecting a region of interest (ROI) in the first image based at least in part on the object detection operation, the ROI being selected before the object detection operation is completed; obtaining a second image coinciding with the ROI of the first image, the second image having a higher resolution than the ROI of the first image; and selectively performing an inferencing operation on the second image based on a result of the object detection operation.

Another innovative aspect of the subject matter of this disclosure can be implemented in an object detection system, including one or more processors and a memory coupled to the one or more processors. The memory stores instructions that, when executed by the one or more processors, cause the object detection system to obtain a first image; perform a first object detection operation on the first image; selecting a region of interest (ROI) in the first image based at least in part on the object detection operation, the ROI being selected before the object detection operation is completed; obtain a second image coinciding with the ROI of the first image, the second image having a higher resolution than the first image; and selectively perform an inferencing operation on the second image based on a result of the object detection operation.

BRIEF DESCRIPTION OF THE DRAWINGS

The present implementations are illustrated by way of example and are not intended to be limited by the figures of the accompanying drawings.

FIG. 7 shows an illustrative flowchart depicting an example operation for object detection in images, according to some implementations.

DETAILED DESCRIPTION

Figure 1:
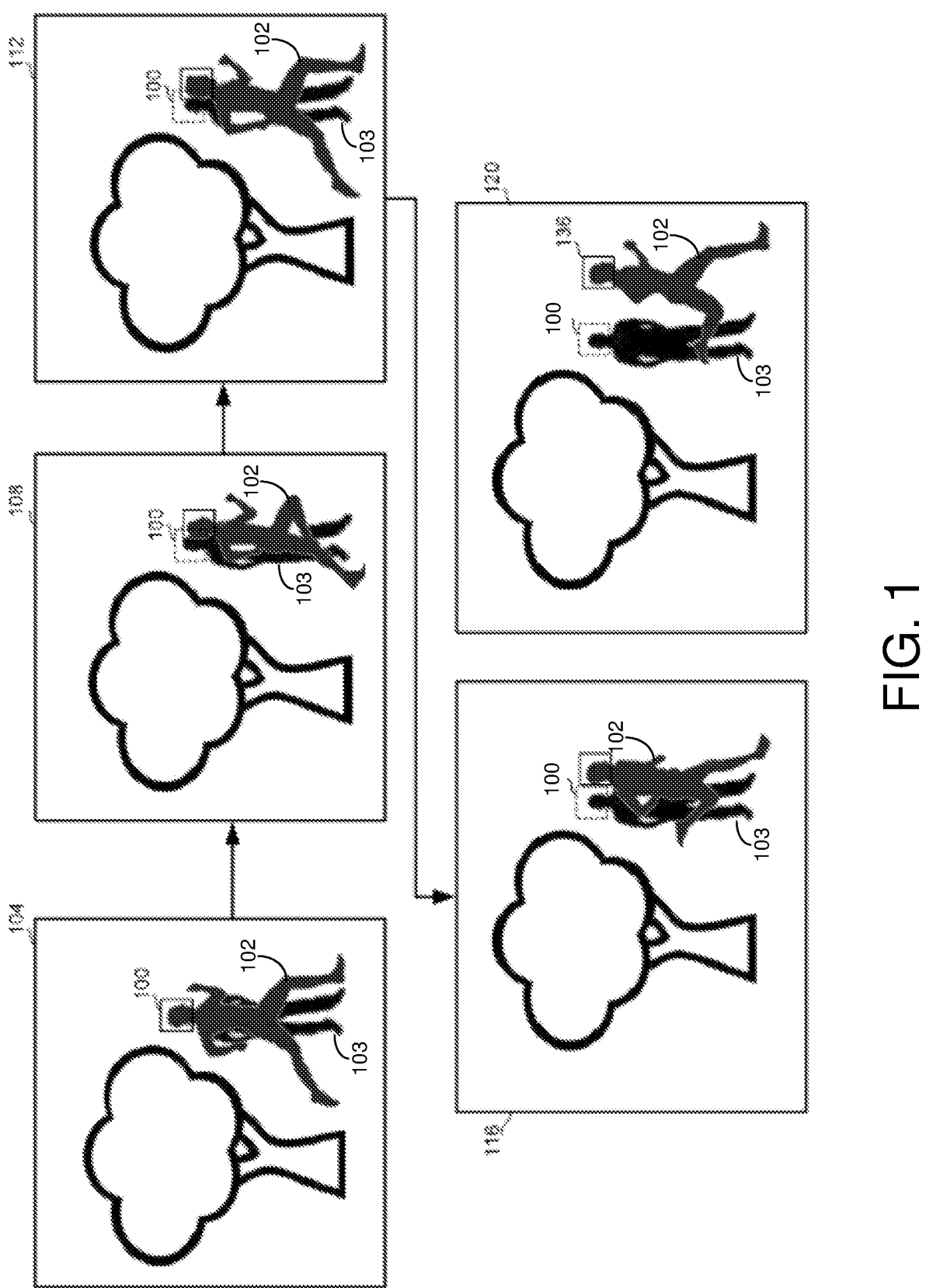
FIG. 1 shows an example sequence of captured images.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, computer vision techniques may include object detection and one or more object-specific inferencing operations, both of which can be computationally resource-expensive. A common approach to reducing the overall computational resource expense is to perform object detection on a low resolution image to identify a region of interest (ROI), and perform object-specific inferencing on the ROI of a higher resolution image. This approach may lead to inaccurate inferencing results due to movement of the object and/or the camera while the object detection operation is being performed. In particular, because the object detection operation can take a relatively long time, an ROI associated with the detected object may no longer be relevant for object-specific inferencing (for example, the object of interest may have already exited the field of view of the camera by the time the object-specific inferencing is performed). However, aspects of the present disclosure recognize that an ROI can be selected based on a "coarse" object detection on a low resolution image before an object detection operation is completed on that image (such as where an object is initially detected with relatively low confidence), which can significantly reduce the delay in acquiring a higher resolution image that includes the object.

Various aspects relate generally to object detection, and more particularly, to cascaded object detection techniques. In some aspects, an object detection system may perform an object detection operation on a first image and select a region of interest (ROI) before completing the object detection operation. The object detection system may further obtain a second image associated with the region of interest, where the second image has a higher resolution than the first image, and selectively perform one or more object-specific inferencing operations on the second image based on a result of the object detection operation. Example suitable inferencing operations may include gaze detection, face detection, and person identification, among other examples.

Particular implementations of the subject matter described in this disclosure can be implemented to realize one or more of the following potential advantages. By selecting an ROI associated with an object of interest prior to completion of the object detection operation, the object detection system can obtain a higher-resolution image associated with the ROI before the object of interest has moved significantly. Accordingly, the higher resolution image is more relevant for object-specific inferencing operations. In other words, object-specific inferencing operations performed on the high resolution images are more likely to be produce valid inferences about an object of interest.

FIG. 1 shows an example sequence of captured images. More specifically, FIG. 1 depicts a series of five images, 104, 108, 112, 116 and 120, that were captured, for example, 50 milliseconds apart. An object of interest (e.g., a person 102 running across the field of view) is captured on the image 104. Other objects (e.g., a person 103 standing behind person 102) may be captured on the image 104 as well. The image 104 may be analyzed (e.g., via an object detection operation) to determine that the person 102 is indeed captured in the image 104 and to identify a location of the person 102. A region of interest (ROI) 100 may be identified based on the location of the person 102 on the image 104. Persons 102 and 103 are also captured in the subsequent images 108, 112, 116, and 120. The image 104 may be relatively low-resolution images, which may not be suitable for object-specific inferencing. Thus, in order to obtain the necessary level of details for object-specific inferencing (e.g., to identify the person 102 or to determine the direction of the person 102's gaze), a higher resolution image may be captured and analyzed responsive to the identification of the ROI 100. For example, the image 120 may be captured at a higher resolution than the image 104.

The time required to detect an object of interest and determine its location in the image 104 (e.g., the ROI 100) may be denoted as T_detect. In other words, T_detect is the time needed to perform an object detection operation. Aspects of the present disclosure recognize that an object of interest can move substantially over the duration of T_detect. For example, person 102 is moving throughout the images 108, 112, and 116 captured during the T_detect for the object detection operation on the image 104. By the time the image 120 is captured (and the object detection operation on the image 104 has completed), the person 102 is no longer located within the ROI 100. In the image 120, the person 102 is detected at a location 136, which does not coincide with ROI 100. In such a case, the details of the face of the person 102 may not be available at the ROI 100. Further, a different person 103 may be captured on the image 120 at the ROI 100. Object-specific inferencing operations, performed on the ROI 100, may produce inferences about the face of the person 103 instead of the face of the person 102, thereby providing an incorrect result.

Figure 2:
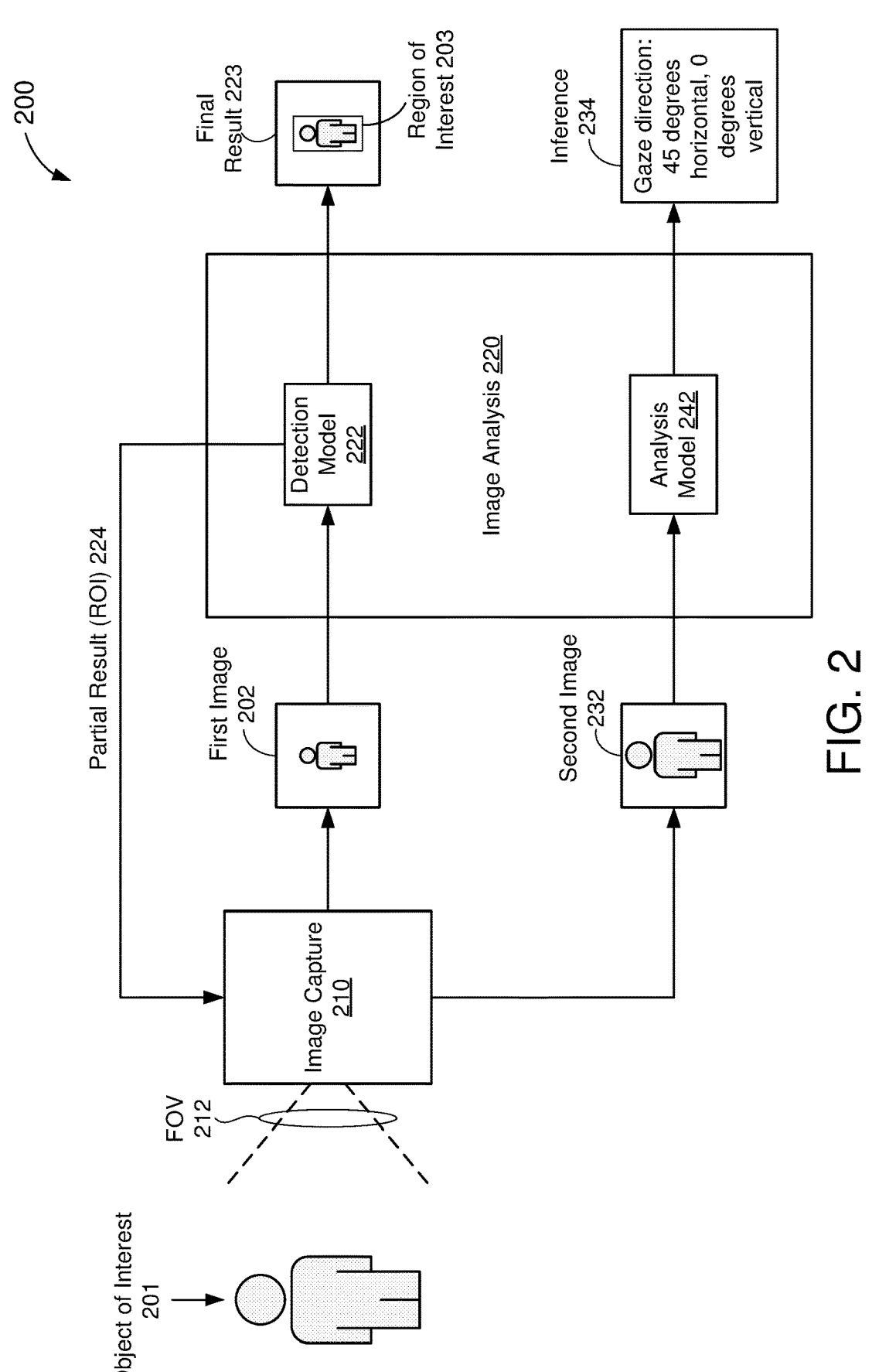
FIG. 2 shows a block diagram of an example object detection system, according to some implementations.

FIG. 2 shows a block diagram of an example object detection system 200, according to some implementations. In some aspects, the object detection system 200 may be configured to generate inferences about one or more objects of interest 201 (also referred to as "target objects"). In the example of FIG. 2, the object of interest 201 is depicted as a person. In some implementations, the object detection system 200 may be configured to generate inferences about one or more other classes of objects of interest (e.g., animals, vehicles, etc.) in addition to, or in lieu of, humans. In some other implementations, the object detection system 200 may be configured to generate inferences about various other objects of interest in addition to, or in lieu of, the object of interest 201.

The system 200 includes an image capture component 210 and an image analysis component 220. The image capture component 210 may be any sensor or device (such as a camera or other imaging device) configured to capture a pattern of light in its field-of-view (FOV) 212 and convert the pattern of light to digital images (e.g., images 202 and 232). For example, a first digital image 202 may include an array of pixels (or pixel values) representing the pattern of light in the FOV 212 of the image capture component 210. In some implementations, the image capture component 210 may continuously (or periodically) capture a series of images 202, 232, and so forth representing a digital video. As shown in FIG. 2, the object of interest 201 is located within the FOV 212 of the image capture component 210. As a result, the first image 202 may include the object of interest 201.

The image analysis component 220 is configured to detect an object of interest in the first image 202 and identify a region of interest (ROI) 203 that includes the detected object. For example, the image analysis component 220 may detect the person 201 in the first image 202 and draw a bounding box around the person 201's face or body, where the bounding box represents an ROI 203 associated with the detected person 201. In some implementations, the image analysis component 220 may output an annotated image indicating the ROI 203 where the location of the object of interest 201 is in relation to the image 202. In some implementations, the image analysis component 220 may output coordinates (e.g., x-y coordinates in a coordinate space of the digital images and/or the image capture component 210) of two or more corners defining the bounding box corresponding to the ROI 203.

In some aspects, the image analysis component 220 may detect the person 201 and identify the ROI 203 based on an object detection model 222. The object detection model 222 may be trained or otherwise configured to detect objects in images or video. For example, the object detection model 222 may apply one or more transformations to the pixels in the first image 202 to create one or more features that can be used for object detection. More specifically, the object detection model 222 may compare the features extracted from the first image 202 with a known set of features that uniquely identify a particular class of objects (such as humans) to determine a presence or location of any target objects of the particular class of objects in the first image 202. In some implementations, the object detection model 222 may be a neural network model. In some other implementations, the object detection model 222 may be a statistical model.

In some aspects, an object detection result or output may be described as "coarse." As used herein, a "coarse" object detection result or output is a result or output that is generated at or above a relatively low threshold of probability and/or confidence level. That is, an object can be detected in the image with a lower threshold of probability and/or confidence level that the image includes the object, and a coarse result may indicate an object that is detected at the lower threshold. Accordingly, a coarse result may reflect a lower level of accuracy and/or precision than a "fine" result or output generated at or above a relatively high threshold of probability and/or confidence level. In some implementations, the image analysis component 220 may include an object detection model 222 that is trained or otherwise configured to generate a coarse partial result and a fine final result. In some other implementations, the image analysis component 220 may include a coarse object detection model trained or otherwise configured to detect objects at a relatively low threshold of probability and/or confidence level (e.g., a model trained to output a coarse final result), and a fine object detection model trained or otherwise configured to detect objects at a relatively high threshold of probability and/or confidence level (e.g., a model trained to output a fine final result). In some implementations, the image analysis component 220 may generate, for the same image and the same object of interest, a coarse result more quickly than a fine result.

In some aspects, the object detection model 222 may output one or more partial or intermediate results 224, as well as a completed or final result 223. That is, the object detection model 222 may generate a partial result (ROI) 224 when the object detection operation is only partially completed (such as when a confidence level of the detection result is below a threshold confidence level) and may generate a final result 223 when the object detection operation is completed (such as when the confidence level of the detection result is above the threshold confidence level). In some implementations, the object detection model 222 may generate a partial result (ROI) 224 when the confidence level of the detection result is above a first threshold confidence level (e.g., the partial result (ROI) 224 is a coarse result), and may generate a final result 223 when the confidence level of the detection result is above a second threshold confidence level that is higher than the first threshold confidence level (e.g., the final result 223 is a fine result). For example, a neural network model having ten layers may produce a partial result based on the output of the fifth layer and a final result based on the output of the tenth layer. In some aspects, a partial result (ROI) 224 may indicate an ROI (e.g., coordinates of the ROI) to be captured at a higher resolution, where the ROI indicated by the partial result (ROI) 224 represents a location of the object of interest as detected at a lower confidence level (e.g., lower confidence level than that of a final result 223).

In some aspects, the image analysis component 220 may detect one or more regions of an image that do not include any object of interest based on the object detection model 222. In some implementations, the object detection model 222 may determine a partial result (ROI) 224 by identifying regions of the image that do not include any object of interest. For example, the image analysis component 220, performing an object detection operation on the first image 202, may identify as regions of non-interest (RONs) one or more areas of the first image 202 with a relatively low probability or confidence level of detection of an object of interest (e.g., a probability of detection below a threshold associated with a determination that there is no object of interest). That is, the probability of detection for an area may be so low, that the area may be identified as having no object of interest. In some implementations, the image analysis component 220 may identify one or more RONs before the object detection operation is completed. The image analysis component 220 may identify an ROI 203 or a partial result (ROI) 224 as an area of the first image 202 remaining after disregarding the identified RONs (e.g., an area or region of the first image 202 that is a complement of the RONs). In some implementations, the image analysis component 220 may output coordinates of the ROI 203 or the partial result (ROI) 224 that remains of the first image 202 when the RONs are disregarded.

In some aspects, the image analysis component 220 may further track and predict a motion of the object of interest 201. In some implementations, the object detection model 222 may be trained or otherwise configured to additionally predict a motion of a detected object. In some other implementations, the image analysis component 220 may include a motion prediction model, separate from the object detection model 222, that is trained or otherwise configured to predict a motion of a detected object. The image analysis component 220 may predict a motion of an object detected based on the object detection model 222 in the first image 202. The image analysis component 220 may identify an ROI 203 or a partial result (ROI) 224 based on the object detection model 222 and the first image 202 (e.g., based on a partial result or a final result), as described above, and adjust the identify the ROI 203 or the partial result (ROI) 224 (e.g., shift the ROI, resize the ROI) based on a prediction of the motion of the detected object.

In some aspects, the location of the object of interest 201 may change over time, for example, based on movements of the object of interest 201 or the image capture component 210. Accordingly, an ROI may longer be relevant if the object associated with the ROI has moved outside of the ROI by the time the detection is made. To ensure that the ROI is relevant for object-specific inferencing, the image analysis component 220 may output a partial result (ROI) 224, before the object detection operation is completed, and the image capture component 210 may capture a second image 232 based on the partial result (ROI) 224. The image capture component 210 may capture the second image 232 at a higher resolution than the first image 202. In some implementations, the second image 232 may include only a portion of the FOV 212 corresponding to the partial result (ROI) 224. In other words, the second image 232 may depict the same ROI using a greater number of pixels (or higher pixel density). For example, the first image 202 may be captured at 1:100 of a maximum resolution of the image capture component 210, and the second image 232 may be captured at 1:10 of the maximum resolution.

In some implementations, the image capture component 210 may receive, from the image analysis component 220, a specification of one or more regions to keep or eliminate and optionally a specification of an image resolution. For example, a specification of the region(s) to keep may include one or more areas corresponding to the ROI 203 or the partial result (ROI) 224. A specification of the region(s) to eliminate may include one or more areas corresponding to the RONs detected in the first image 202 (and the regions to keep are the complement of the area(s) corresponding to the RONs). The specification of regions may use any technically feasible scheme and syntax, an example of which is described below with reference to FIG. 5. The image capture component 210 may receive a pattern of light from the full FOV 212 and selectively convert and/or store the light into digital image data based on whether the light corresponds to a region to keep. For example, the image capture component 210 may convert the light corresponding to the region to keep into digital image data and disregard the digital image data not corresponding to the region to keep. As another example, the image capture component 210 may convert the light from the full FOV into digital image data, and store the digital image data corresponding to the region to keep, and disregard the digital image data not corresponding to the region to keep.

In some implementations, the size and resolution of an ROI to be captured in the second image 232 (e.g., partial result (ROI) 224), may be limited by the object detection system 200. For example, the object detection system 200 may have a predefined maximal number of pixels, for a given image, that can be accommodated in memory and processed by a processor. Accordingly, the size of the ROI and the resolution may trade off each other to comply with the maximal number of pixels. For example, the larger of the ROI for the second image 232, the lower the resolution the second image 232 may have (but still a higher resolution than the first image 202), and vice versa.

The image analysis component 220 may also configured to produce one or more object-specific inferences 234 based on a digital image (e.g., the second image 232). Example suitable object-specific inferences may include, among other examples, a classification of the object (e.g., type of person, type of animal, type of object), an identity of the object (e.g., identity of a person, identification of an object), a gaze direction of a person, and/or facial expression of a person. The image analysis component 220 may produce an inference 234 based on an object analysis model 242. The object analysis model 242 may be trained or otherwise configured to produce certain inferences regarding detected objects in images or video. For example, an object analysis model may be a gaze detection model that determines a gaze direction of a person detected in an image. As shown in FIG. 2, for example, the inference 234 is a gaze direction of the person 201. In some implementations, the object analysis model 242 may be a neural network model. In some other implementations, the object analysis model 242 may be a statistical model. In some implementations, the object detection system 220 may include multiple object analysis models 242, each trained for different inferencing tasks (e.g., respective models for gaze direction, person identification, animal classification, etc.).

In some implementations, the image analysis component 220 may use a final result 223 of the object detection model 222 to validate the partial result (ROI) 224, and thus validate the second image 232, as including the object of interest 201. For example, the final result 223 of the object detection model 222 may include an ROI 203 corresponding to a person 201 detected with a higher confidence level compared to the partial result. If the final result 223 indicates that the partial result (ROI) 224 is incorrect (e.g., the partial result (ROI) 224 does not coincide with the ROI 203), the image analysis component 220 may stop processing the second image 232 based on the object analysis model 242, and the image analysis component 220 may discard the second image 232. If the final result 223 indicates that the partial result (ROI) 224 is correct (e.g., the partial result (ROI) 224 coincides with the ROI 203), the image analysis component 220 may proceed with analyzing the second image 232 based on the object analysis model 242.

In some implementations, the object detection system 200 may obtain, subsequent to the second image 232, one or more further images for analysis. For example, if the inference 234 is not suitable (e.g., because the second image 232 did not include sufficient detail for object-specific inferencing), the image capture component 210 may capture a third image at a higher resolution than the second image 232, and the image analysis component 220 may analyze the third image based on the object analysis model 242 to generate one or more object-specific inferences. In some implementations, the image capture component 210 may capture the third image based on the ROI 203 in the final result 223 (e.g., the third image includes a portion of the FOV corresponding to the ROI 203) or other information indicating an ROI that is validated and/or refined versus the partial result (ROI) 224.

Figure 3:
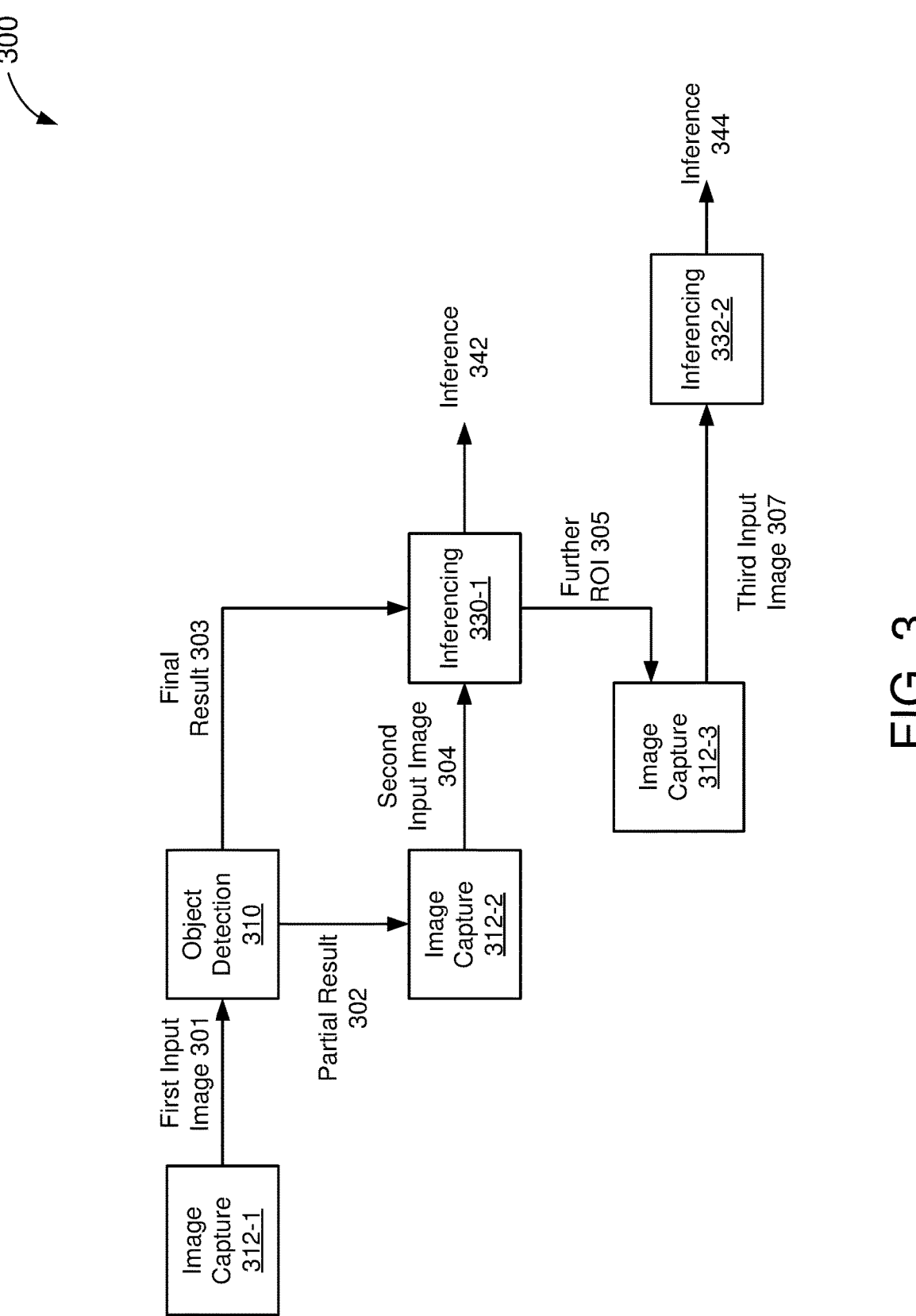
FIG. 3 shows a block diagram illustrating a cascaded object detection process, according to some implementations.

FIG. 3 shows a block diagram illustrating a cascaded object detection process 300, according to some implementations. The cascaded object detection process 300 is an example of an object detection process that may be implemented by the object detection system 200 of FIG. 2. As shown in FIG. 3, the process 300 includes capturing 312-1 a first input image 301 and performing an object detection operation 310 on the first image 301. With reference for example to FIG. 2, the object detection operation 310 may implement the object detection model 222 to detect objects of interest in the first input image 301. In some implementations, the object detection operation 310 may produce a partial object detection result 302 that indicates an ROI associated with an object of interest before producing a final result 303 (such as described with reference to FIG. 2).

The process 300 proceeds with capturing 312-2 a second input image 304 based on the partial result 302 and performing an object-specific inferencing operation 330-1 on the second input image 304. For example, the second input image 304 may depict the ROI indicated by the partial result 302 at a higher resolution than the corresponding region of the first input image 301. With reference for example to FIG. 2, the object-specific inferencing operation 330-1 may produce one or more inferences 342 about an object of interest in the second input image 304 based on the object analysis model 242 (also referred to as "object-specific inferences").

In some implementations, the object-specific inferencing operation 330-1 may use the final result 303 of the object detection operation 310 to validate the second input image 304. As described with reference to FIG. 2, the final result 303 may be a more accurate indication of whether the input image 301 includes an object of interest (and the ROI associated with any detected object). Thus, if the ROI indicated by the partial result 302 coincides with the ROI indicated by the final result 303, then the object-specific inferencing operation 330-1 may proceed to completion. However, if the ROI indicated by the partial result 302 does not coincide with the ROI indicated by the final result 303, then the object-specific inferencing operation 330-1 may terminate (and the second input image 304 may be discarded).

In some implementations, if the object-specific inferencing operation 330 does not produce any suitable object-specific inference 342 then the process 300 may proceed to capture 312-3 a third input image 307 depicting an ROI 305 having an even higher resolution than the corresponding ROI of the second input image 304. In some implementations, the ROI 305 may be the ROI indicated by the partial result 302. In some other implementations, the ROI 305 may be the ROI indicated by the final result 303.

In some aspects, the process 300 may perform an object-specific inferencing operation 330-2 on the third input image 307, which may produce an object-specific inference 344. If the object-specific inferencing operation 330-2 fails to produce a suitable inference 344, then the process 300 may capture yet another input image at an even higher resolution (e.g., depicting the same ROI). The process 300 may proceed in this manner, for example, by progressively capturing images at higher resolutions until one or more suitable inferences are produced (or until the object detection system 200 cannot feasibly capture or process any higher-resolution images).

Figure 4:
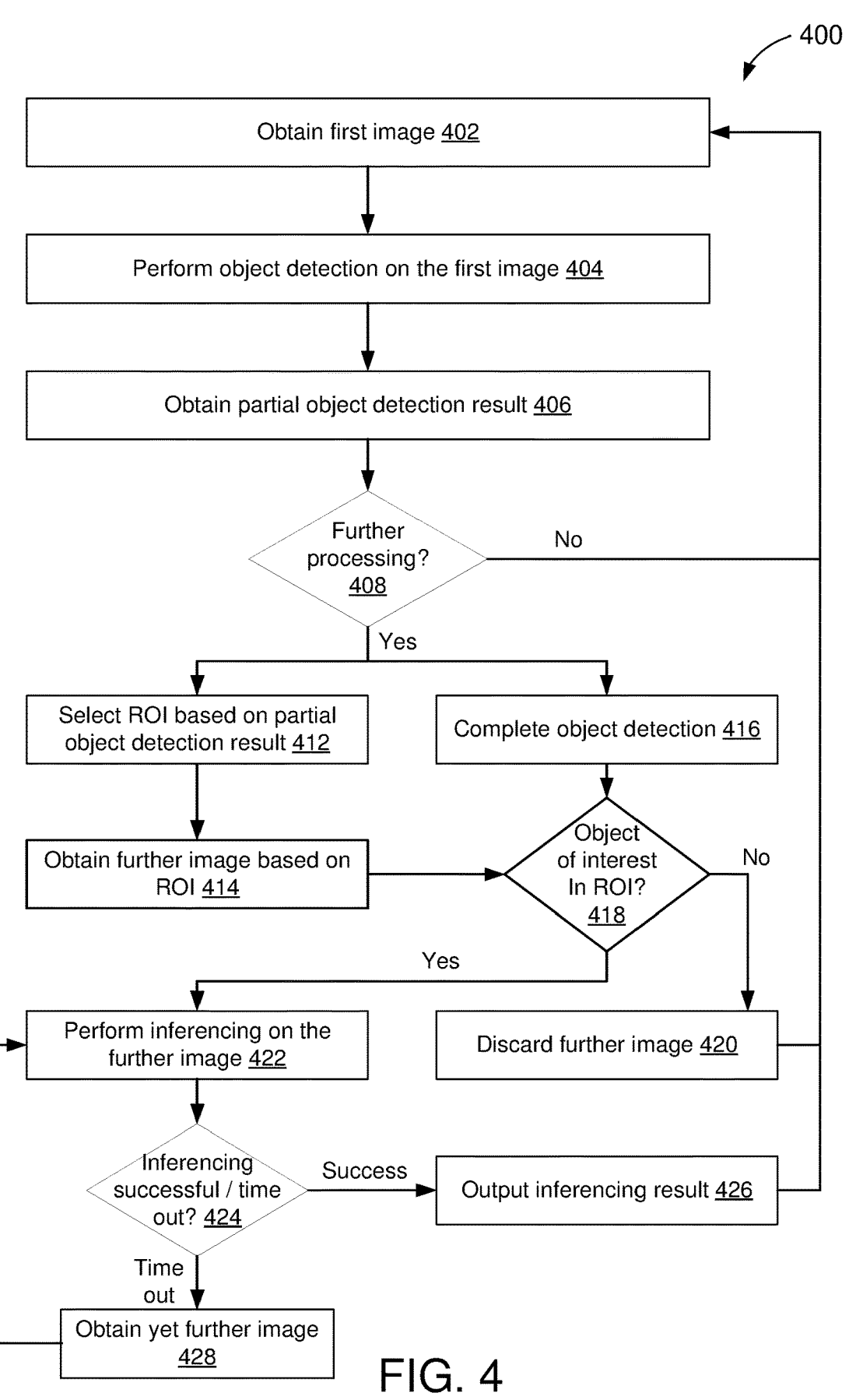
FIG. 4 shows a flowchart of a process for object detection in images, according to some implementations.

FIG. 4 shows a flowchart of a process 400 for object detection in images, according to some implementations. The process 400 may be performed by an object detection system (e.g., object detection system 200) to implement a cascaded object detection process (e.g., cascaded process 300).

As shown, the process 400 begins at step 402, where an object detection system may obtain a first image. The image capture component 210 may capture a first image 202 and store the first image 202 (e.g., in a memory). At step 404, the object detection system may perform object detection on the first image. The image analysis component 220 may analyze the first image 202 based on an object detection model 222 in order to attempt to detect an object (e.g., an object of interest 201).

At step 406, the object detection system may obtain a partial object detection result. The image analysis component 220 may obtain a partial result (ROI) 224 of the object detection analysis of the first image 202 performed in step 404. If the object detection system determines, based on the partial object detection result, that there is to be no further processing based on the partial result (408—No), the process 400 returns to step 402, where a new first image may be obtained. For example, if the image analysis component 220 detects no object of interest at all in the first image 202 based on the partial result (ROI) 224 (e.g., the entire first image 202 is a RON), the image analysis component 220 may disregard the first image 202, and a new first image may be obtained.

If the object detection system determines, based on the partial object detection result, that there is to be further processing (408—Yes), then the object detection system may select an ROI based on the partial object detection result (412). The image analysis component 220 may select an ROI in the partial result (ROI) 224 obtained in step 406 and provide the partial result (ROI) 224 to the image capture component 210.

The object detection system 200 may obtain a further image based on the ROI (414). The image capture component 210 may capture a second image 232 based on the partial result (ROI) 224. The process proceeds to step 418. In some implementations, the image capture component 210 may initiate capturing the second image 232 before receiving the partial result (ROI 224). Responsive to receiving the partial result (ROI) 224, the image capture component 210 may selectively capture or omit portions of the FOV yet to be captured and/or selectively keep or disregard already-captured portions of the FOV based on the partial result (ROI) 224.

If there is to be further processing (408—Yes), the object detection system may also complete the object detection on the first image (416). The image analysis component 220 may obtain a final result 223 of the object detection analysis of the first image 202. The process proceeds to step 418.

If no object of interest in the ROI (418—No), then the process 400 proceeds to step 420, where the further image is discarded, and then the process 400 returns to step 402. If the image analysis component 220 determines that an object of interest is not detected in the partial result (ROI) 224 based on the final result 223 of the object detection in step 416 (e.g., the partial result (ROI) 224 is not validated based on the ROI 203 in the final result 223), or that an object of interest is not detected in the first image 202 at all based on the final result 223 (e.g., the partial result (ROI) 224 is determined to be a false positive based on the final result 223), then the second image 232 may be discarded, and a new first image may be obtained.

If an object of interest is detected in the ROI (418—Yes), then the process 400 proceeds to step 422, where the object detection system performs object-specific inferencing on the further image. If the image analysis component 220 validates, based on the final result 223 of the object detection in step 416, that an object of interest 201 is detected in the partial result (ROI) 224, then the image analysis component 220 may perform an object-specific inferencing operation on the second image 232 based on an inferencing model 242.

If the inferencing is successful (424—Success), then the process 400 proceeds to step 426, where the object detection system may output the object-specific inferencing result (e.g., to an application, to a user, to a database for storage, to a device for display, to a device for activating an entry control system, etc.). The image analysis component 220 may output an object-specific inference 234 to a relevant application (e.g., an inference of a person's identity to a security monitoring application or an authentication application). The process 400 may proceed to step 402, where a new first image may be obtained.

If the inferencing operation times out or the produced inference is otherwise unsuitable (424—Time out), then the process 400 proceeds to step 428, where the object detection system may obtain yet a further image with a higher resolution that the prior further image. The image capture component 210 may capture a further image based on an ROI selected based on the final result 223 (e.g., ROI 203 in the final result 223). The process 400 proceeds back to step 422, where the object detection system performs inferencing on the yet further image.

Figure 5:
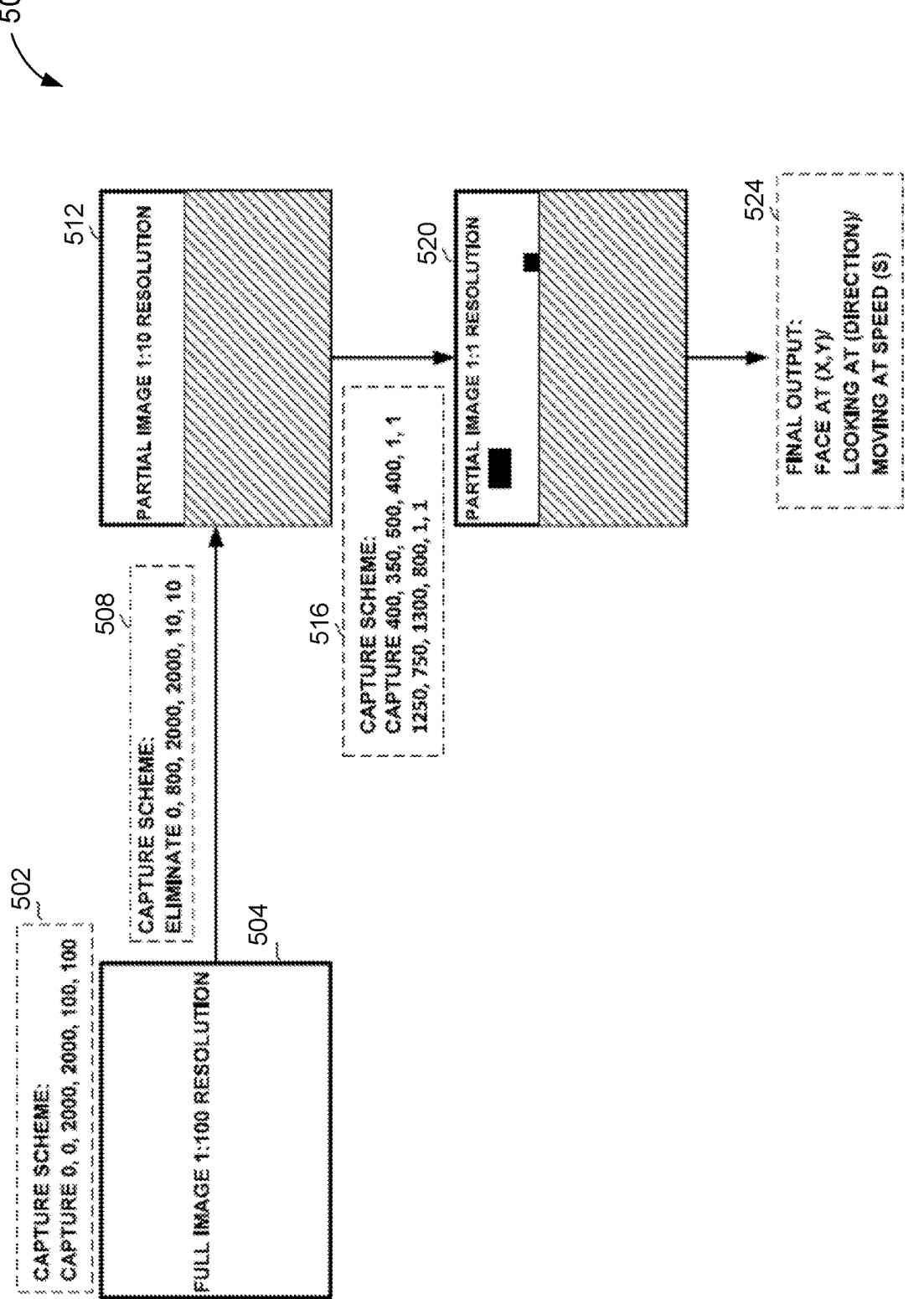
FIG. 5 shows another sequence of captured images, according to some implementations.

FIG. 5 shows another sequence 500 of captured images, according to some implementations. The sequence 500 illustrates an example of images captured in a cascaded object detection process (e.g., process 300) performed by the object detection system 200.

The image capture component 210 may receive a capture specification 502 from image analysis component 220 (e.g., at the start or restart of a cascaded process 300) indicating an FOV 212 for a first image to be captured, having the full coordinates (0,0,2000,2000) denoting the x and y coordinates of the upper left and lower right corners of the FOV 212, at a low resolution of 1:100 of the maximum resolution of the image capture component (e.g., 1:10 in each of the x and y dimensions). Thus, the specification may be provided as a set of values, the first indicating whether the following regions are to be captured or eliminated, followed by the corners of a rectangle as described above, and further followed by a capture resolution. Thus, specification 502 may include the values (capture, 0, 0, 2000, 2000, 100, 100), as shown in FIG. 5. It is appreciated that the specification may also be provided according to a different syntax indicating areas to be captured, wherein areas to be eliminated are described by the complementary areas to be captured. In some implementations, the specification may further include, for an area to be captured, values for other settings such as local GAIN, digital zoom, sharpening, or other aspects of image processing applied to the captured pixels before, during or after capture.

The image capture component 210 may capture an image 504 in accordance with specification 502. The image analysis component 220 may determine, based on a partial result (ROI) 224 of an object detection operation, that the lower part of the image 504 is unlikely to include an object of interest. Accordingly, the image analysis component 220 may identify the lower part of the image 504 as an RON and provide a second specification 508 to the image capture component 210, indicating that the area between (0, 800) and (2000, 2000) should be eliminated. For example, specification 508 may include, as shown, the set of values (eliminate, 0, 800, 2000, 2000, 10, 10). The image capture component 210 may capture an image 512 based on the specification 508. Accordingly, the image 512 includes an area remaining after eliminating the area between (0, 800) and (2000, 2000), at 1:10 of the maximum resolution.

In some implementations, the image capture component 210 may store a portion of the digital image data, corresponding to certain regions, obtained from converting a pattern of light in its FOV 212. For example, the image capture component 210 may include a multitude of image sensors, each corresponding to a respective portion of the FOV 212 and responsible for converting the pattern of light for the respective portion of the FOV 212 into digital image data. The image capture component 210 may selectively store, for each image sensor, digital image data obtained from converting the pattern of light. Accordingly, the image capture component may store digital image data corresponding to certain portions of the FOV 212 and disregard digital image data corresponding to other portions of the FOV 212 (e.g., sample data from certain image sensors and not others). The FOV portions for which digital image data is to be stored or not stored may be specified as areas to capture or areas to eliminate, respectively. In some implementations, the image capture component 210 may convert the pattern of light from the full FOV 212 into a digital image and then crop the digital image to the desired portion based on a specification of areas to capture or areas to eliminate.

The image analysis component 220 may determine, based on an analysis of the image 512 (e.g., a further object detection operation), that the image 512 includes two rectangular ROIs at the areas specified by the coordinates (400, 350, 500, 400) and (1250, 750, 1300, 800), respectively, to be captured at the highest resolution of 1:1 of the maximum resolution. Thus, the image analysis component 220 may provide a specification 516 that includes the indication of (capture, 400, 350, 500, 400, 1, 1) and (capture 1250, 750, 1300, 800, 1, 1) to the image capture component 210.

In some implementations, multiple rectangles, or more generally multiple ROIs, may be specified in any of a number of ways. For example, the values of the pixels of the ROIs (e.g., the coordinates of the ROIs) may be provided one by one or in batches, and the values may be deconvoluted or demultiplexed into ROIs.

The image capture component 210 may capture an image 520 according to the specification 516. The image analysis component 220 may analyze the captured image 516 to produce an object-specific inference 524 (e.g., a location of a face, a looking direction of a captured person, and/or the like). For example, the inference 524 includes coordinates of a location of a face of a person, a looking direction of the person, and a motion speed of the person.

It will be appreciated that the object detection system 200 of FIG. 2, cascaded process 300 of FIG. 3, and the process 400 of FIG. 4, are not necessarily limited to three images, and shallower or deeper cascades of images may be used, where any stage within the cascade may relate to capturing one or more ROIs or eliminating one or more RONs, or analyzing the frame for an object-specific inference.

Figure 6:
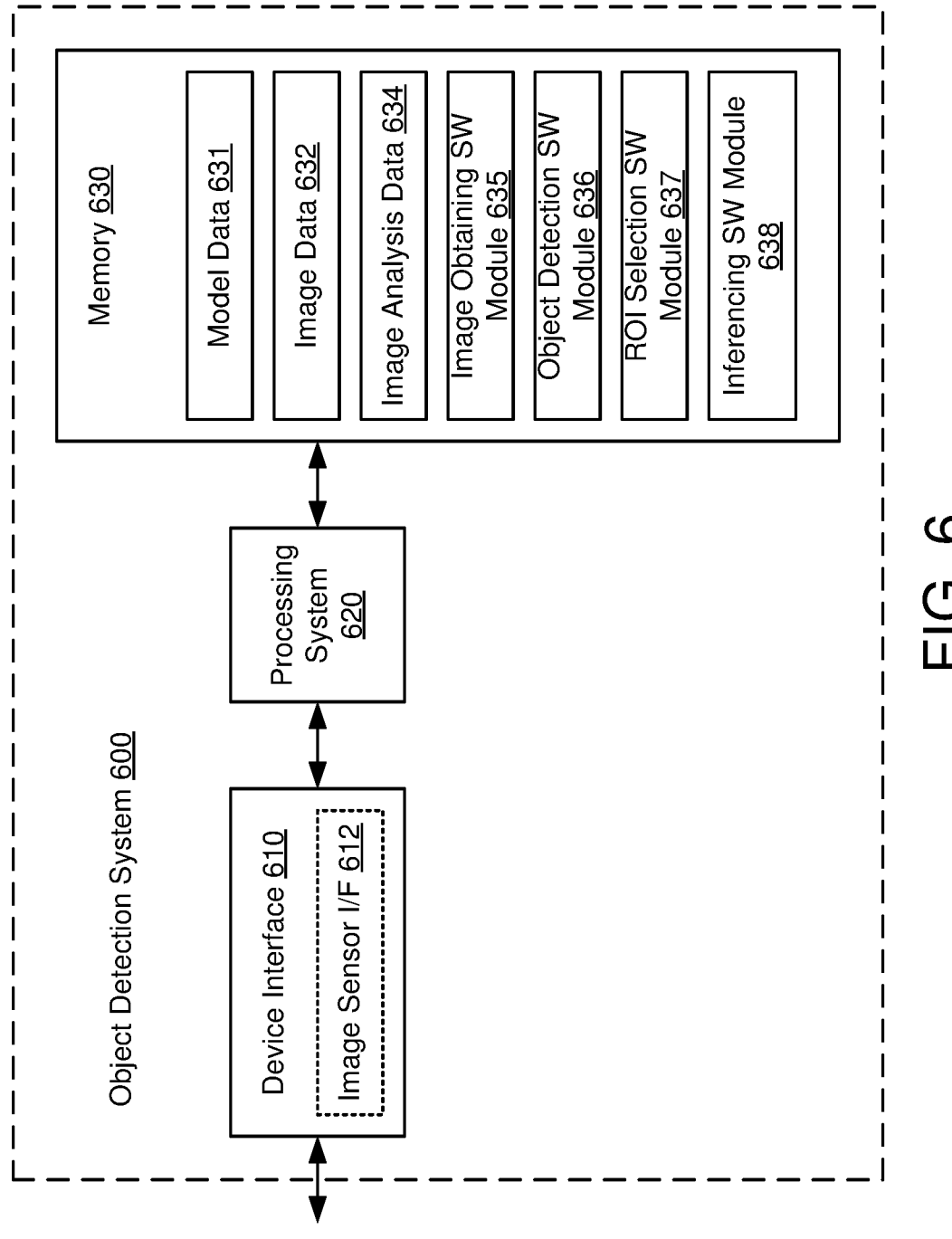
FIG. 6 shows another block diagram of an example object detection system, according to some implementations.

FIG. 6 shows another block diagram of an example object detection system 600, according to some implementations. More specifically, the object detection system 600 may be configured to perform a cascaded object detection operation on an image. In some implementations, the object detection system 600 may be one example of the object detection system 200 of FIG. 2. The object detection system 600 includes a device interface 610, a processing system 620, and a memory 630.

The device interface 610 is configured to communicate with one or more components of an image capture device (such as the image capture component 210 of FIG. 2). In some implementations, the device interface 610 may include an image sensor interface (I/F) 612 configured to receive an image via an image capture device. In some implementations, the image sensor interface 612 may capture images according to specifications of areas to keep or eliminate. For example, a specification of areas to keep or eliminate may represent the areas to be included in the image to be provided to the processing system 620.

The memory 630 may include a data store 631 configured to store one or more models for object detection and/or inferencing, a data store 632 configured to store one or more received images and a data store 634 configured to store output data of analyses of images, including for example results of object detection operations and results of inferencing operations. The memory 630 also may include a non-transitory computer-readable medium (including one or more nonvolatile memory elements, such as EPROM, EEPROM, Flash memory, or a hard drive, among other examples) that may store at least the following software (SW) modules:

> an image obtaining SW module 635 to obtain respective images, including a first image and a second image, where the second image coincides with a region of interest (ROI) of the first image and has a higher resolution than the ROI of the first image;
> an object detection SW module 636 to perform an object detection operation on the first image;
> an ROI selection SW module 637 to select an ROI in the first image based at least in part on the object detection operation, the ROI being selected before the object detection operation is completed; and
> an inferencing SW module 638 to selectively perform an inferencing operation on the second image based on a result of the object detection operation.

Each software module includes instructions that, when executed by the processing system 620, causes the object detection system 600 to perform the corresponding functions.

The processing system 620 may include any suitable one or more processors capable of executing scripts or instructions of one or more software programs stored in the object detection system 600 (such as in the memory 630). For example, the processing system 620 may execute the object detection SW module 636 to perform an object detection operation on the first image, and may execute the ROI selection SW module 637 to select, before the object detection operation is completed, an ROI in the first image based at least in part on the object detection operation.

FIG. 7 shows an illustrative flowchart depicting an example operation 700 for object detection, according to some implementations. In some implementations, the example operation 700 may be performed by an object detection system such as the object detection system 200 of FIG. 2.

The object detection system may obtain a first image (710). The object detection system may perform an object detection operation on the first image (720). The object detection system may select an region of interest (ROI) in the first image based at least in part on the object detection operation, the ROI being selected before the object detection operation is completed (730). The object detection system may obtain a second image coinciding with the ROI of the first image, the second image having a higher resolution than the ROI of the first image (740). The object detection system may perform an inferencing operation on the second image based on a result of the object detection operation (750).

In some aspects, the object detection system may select the ROI in the first image based on a partial result of the object detection operation on the first image.

In some aspects, the object detection operation is performed based on an object detection model configured to detect humans.

In some aspects, the object detection operation may comprise a face detection operation, and the inferencing operation may comprise at least one of a gaze detection operation, a person identification operation, or a motion detection operation.

In some aspects, the second image may be obtained prior to completion of the object detection operation.

In some aspects, the object detection system may detect an object of interest in the first image based on the object detection operation; identify a location of the object of interest in the first image; and select a portion of the first image coinciding with the location of the object of interest as the ROI.

In some aspects, the object detection system may identify one or more regions of non-interest (RON) in the first image based on the object detection operation, the ROI including any portion of the first image that does not overlap the one or more regions of non-interest (RON).

In some aspects, the object detection system may perform a motion tracking operation, with respect to an object of interest, on the first image; and identify the ROI based on the motion tracking operation.

In some aspects, the object detection system may obtain a third image associated with a portion of the second image; and selectively perform a second inferencing operation on the third image.

In some aspects, the obtaining of the third image is responsive to a completed result of the object detection operation.

In some aspects, the third image has a higher resolution than the second image.

In some aspects, the inferencing operation on the second image is performed responsive to the result of the object detection operation indicating that an object of interest is detected in the ROI.

In some aspects, the object detection system may discard the second image responsive to the result of the object detection operation indicating that no object of interest is detected in the ROI.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for object detection in images, comprising:
obtaining a first image captured by an image capture component;
performing an object detection operation on the first image;
selecting a region of interest (ROI) in the first image based at least in part on a partial result of the object detection operation, the partial result being generated before the object detection operation is completed;
obtaining a second image captured by the image capture component and coinciding with the ROI of the first image, the second image having a higher resolution than the ROI of the first image;
generating a final result based on the completion of the object detection operation;
determining whether the final result of the object detection operation validates the partial result; and
selectively performing an inferencing operation on the second image based on whether the final result of the object detection operation validates the partial result.

2. The method of claim 1, wherein the selecting of the ROI in the first image comprises selecting the ROI in the first image based on the partial result of the object detection operation on the first image.

3. The method of claim 1, wherein the object detection operation is performed based on an object detection model configured to detect humans.

4. The method of claim 1, wherein the inferencing operation comprises at least one of a gaze detection operation, a person identification operation, or a motion detection operation.

5. The method of claim 1, wherein the second image is obtained prior to completion of the object detection operation.

6. The method of claim 1, wherein the selecting of the ROI in the first image comprises:
detecting an object of interest in the first image based on the object detection operation;
identifying a location of the object of interest in the first image; and
selecting a portion of the first image coinciding with the location of the object of interest as the ROI.

7. The method of claim 1, wherein the selecting of the ROI in the first image comprises:

identifying one or more regions of non-interest (RON) in the first image based on the object detection operation, the ROI including any portion of the first image that does not overlap the one or more regions of non-interest (RON).

8. The method of claim 1, wherein the selecting of the ROI in the first image comprises:

performing a motion tracking operation, with respect to an object of interest, on the first image; and identifying the ROI based on the motion tracking operation.

9. The method of claim 1, further comprising:

obtaining a third image associated with a portion of the second image; and selectively performing a second inferencing operation on the third image.

10. The method of claim 9, wherein the obtaining of the third image is responsive to the final result of the object detection operation.

11. The method of claim 9, wherein the third image has a higher resolution than the second image.

12. The method of claim 1, wherein the final result of the object detection operation validating the partial result includes the final result indicating that an object of interest is detected in the ROI.

13. The method of claim 1, further comprising discarding the second image responsive to the final result of the object detection operation indicating that no object of interest is detected in the ROI.

14. An object detection system, comprising:

one or more processors; and a memory coupled to the one or more processors, the memory storing instructions that, when executed by the one or more processors, cause the object detection system to:

obtain a first image captured by an image capture component;

perform a first object detection operation on the first image;

select a region of interest (ROI) in the first image based at least in part on a partial result of the object detection operation, the partial result being generated before the object detection operation is completed;

obtain a second image captured by the image capture component and coinciding with the ROI of the first image, the second image having a higher resolution than the first image;

generate a final result based on the completion of the object detection operation;

determine whether the final result of the object detection operation validates the partial result; and selectively perform an inferencing operation on the second image based on whether the final result of the object detection operation validates the partial result.

15. The object detection system of claim 14, wherein execution of the instructions further causes the object detection system to select the ROI in the first image based on the partial result of the object detection operation on the first image.

16. The object detection system of claim 14, wherein the second image is obtained prior to completion of the object detection operation.

17. The object detection system of claim 14, wherein execution of the instructions further causes the object detection system to:

detect an object of interest in the first image based on the object detection operation;

identify a location of the object of interest in the first image; and select a portion of the first image coinciding with the location of the object of interest as the ROI.

18. The object detection system of claim 14, wherein execution of the instructions further causes the object detection system to identify one or more regions of non-interest (RON) in the first image based on the object detection operation, the ROI including any portion of the first image that does not overlap the one or more regions of non-interest (RON).

19. The object detection system of claim 14, wherein execution of the instructions further causes the object detection system to:

perform a motion tracking operation, with respect to an object of interest, on the first image; and identify the ROI based on the motion tracking operation.

20. The object detection system of claim 14, wherein execution of the instructions further causes the object detection system to discard the second image responsive to the final result of the object detection operation indicating that no object of interest is detected in the ROI.

\* \* \* \* \*